US012513144B2

(12) United States Patent
Albero et al.

(10) Patent No.: US 12,513,144 B2
(45) Date of Patent: Dec. 30, 2025

(54) SYSTEM AND METHOD FOR VALIDATING AN INTERACTION

(71) Applicant: Bank of America Corporation, Charlotte, NC (US)

(72) Inventors: George A. Albero, Charlotte, NC (US); Naga Vamsi Krishna Akkapeddi, Charlotte, NC (US); Nagasubramanya Lakshminarayana, Concord, NC (US); Yuvraj Singh, Delhi (IN); Durga Prasad Kuttumolu, Hyderabad (IN)

(73) Assignee: Bank of America Corporation, Charlotte, NC (US)

( * ) Notice: Subject to any disclaimer, the term of this patent is extended or adjusted under 35 U.S.C. 154(b) by 40 days.

(21) Appl. No.: 18/663,588

(22) Filed: May 14, 2024

(65) Prior Publication Data
US 2025/0358282 A1  Nov. 20, 2025

(51) Int. Cl.
H04L 29/06 (2006.01)
G06F 21/62 (2013.01)
G06Q 20/40 (2012.01)
G06Q 40/03 (2023.01)
H04L 9/40 (2022.01)

(52) U.S. Cl.
CPC ...... *H04L 63/0876* (2013.01); *G06F 21/6254* (2013.01); *G06Q 20/4016* (2013.01); *G06Q 40/03* (2023.01); *H04L 63/02* (2013.01)

(58) Field of Classification Search
CPC . H04L 63/0876; H04L 63/02; G06F 21/6254; G06Q 20/4016; G06Q 40/03
See application file for complete search history.

(56) References Cited

U.S. PATENT DOCUMENTS

| 7,739,169 | B2 | 6/2010 | Hammad |
| 7,865,939 | B2* | 1/2011 | Schuster ............... H04L 63/029 726/13 |
| 9,065,643 | B2 | 6/2015 | Hurry et al. |
| 9,082,120 | B2 | 7/2015 | Oder, II et al. |
| 9,558,494 | B2 | 1/2017 | Dawkins et al. |
| 9,898,730 | B2 | 2/2018 | Flitcroft et al. |
| 10,147,089 | B2 | 12/2018 | Powell |
| 11,423,367 | B2 | 8/2022 | Arora |
| 11,429,959 | B2 | 8/2022 | Black et al. |

(Continued)

*Primary Examiner* — Harunur Rashid

(57) ABSTRACT

A method is provided that includes receiving a request to perform an interaction that includes user data and device data. The method includes splitting the user data into one or more logical data components. The method includes comparing the one or more logical data components to one or more predetermined validation thresholds. The method includes determining whether the one or more logical data components satisfy the one or more predetermined validation thresholds. In response to determining that the one or more logical data components satisfy the one or more predetermined validation thresholds, the method includes obfuscating the one or more logical data components to generate one or more unique identifiers, and obfuscating the device data to generate a unique device identifier. The method includes generating an authentication response configured to authorize the external entity server to perform the interaction that includes the unique identifiers and unique device identifier.

20 Claims, 2 Drawing Sheets

(56) References Cited

U.S. PATENT DOCUMENTS

| | | | |
|---|---|---|---|
| 11,757,940 B2* | 9/2023 | Vaidya | H04L 67/10 |
| | | | 726/11 |
| 2005/0102500 A1* | 5/2005 | Khangaonkar | H04L 63/02 |
| | | | 713/153 |
| 2006/0136332 A1 | 6/2006 | Ziegler | |
| 2010/0161494 A1 | 6/2010 | Slater | |
| 2018/0285599 A1 | 10/2018 | Praveen | |
| 2018/0315043 A1 | 11/2018 | Royyuru | |

* cited by examiner

SYSTEM AND METHOD FOR VALIDATING AN INTERACTION

TECHNICAL FIELD

This disclosure relates generally to data security and network interactions. More particularly, this disclosure relates to a system and method for validating an interaction.

BACKGROUND

Interactions may be submitted to an internal entity server from outside of a firewall. In some instances, before the internal entity server may process the interaction, the internal entity server may request third-party applications outside of the firewall to provide information in order to validate data associated with the interaction. After collecting information from the third-party applications, the internal entity server may use the information collected to perform further validations, data enrichments, and processing behind the firewall.

SUMMARY

The systems and methods in the present disclosure provide practical applications and technical advantages that overcome the current technical problems described herein. As discussed above, internal entity servers may receive requests to perform interactions from a source outside of a firewall, and the internal entity server may request third-party applications outside of the firewall to provide information in order to validate data associated with the interaction. One disadvantage of this process is that as the data is shared outside of the firewall (e.g., between the source and the internal entity server and between the internal entity server and the third-party applications), there is a chance that the data could be intercepted and interpreted by a bad actor.

The provided systems and methods are integrated into several practical applications and technical advantages. First, the disclosed systems and methods provide an improvement to the underlying technology by providing an efficient operation for authorizing or denying an interaction request using an internal entity server communicatively coupled to an external entity server and separated by a firewall, as will be detailed below. Second, the disclosed systems and methods provide improved data security by splitting user data associated with the interaction into one or more logical data components and obfuscating the one or more logical data components into one or more unique identifiers. The one or more unique identifiers replace data associated with the interaction before sending an authentication response outside of the firewall. By doing this, even if a bad actor intercepts the authentication response and tries to interpret the data, the data is obfuscated by the unique identifiers and mitigates, or otherwise prevents, the bad actor from interpreting the data, thereby improving data security. Further, as will be detailed below, using the entity server to split the user data into one or more logical components prior to sending to the internal entity server improves the speed at which the internal entity server may process the user data to either authorize or deny the interaction.

In some embodiments, the present disclosure provides a system comprising an external entity server, an internal entity server communicatively coupled to the external entity server and separated by a firewall. The external entity server comprises a first processor configured to receive a request to perform an interaction where the request comprises user data and device data. The first processor is configured to split the user data into one or more logical data components, wherein the one or more logical data components comprise at least a first logical data component and a second logical data component. The first processor is configured to transfer at least the first logical data component, the second logical data component, and the device data to the internal entity server through the firewall. The internal entity server comprises a memory operable to store at least a first predetermined validation threshold and a second predetermined validation threshold. The internal entity server further comprises a second processor operably coupled to the memory. The second processor is configured to compare the first logical data component to the first predetermined validation threshold, and compare the second logical component data to the second predetermined validation threshold. The second processor is configured to determine whether the first logical data component and the second logical data component are validated, wherein the first logical data component and the second logical data component are validated if the first logical data component and the second logical data component satisfy the first predetermined validation threshold and the second predetermined validation threshold, respectively. In response to determining that the first logical data component and the second logical data component are validated, the second processor is configured to obfuscate the first logical data component by generating a first unique identifier associated with the first logical data component, and obfuscate the second logical data component by generating a second unique identifier associated with the second logical data component. The second processor is further configured to obfuscate the device data by generating a unique device identifier associated with the device data, and generate an authentication response configured to authorize the external entity server to perform the interaction, wherein the authentication response comprises the first unique identifier, the second unique identifier, and the unique device identifier.

Certain embodiments of this disclosure may include some, all, or none of these advantages. These advantages and other features will be more clearly understood from the following detailed description taken in conjunction with the accompanying drawings and claims.

BRIEF DESCRIPTION OF THE DRAWINGS

For a more complete understanding of this disclosure, reference is now made to the following brief description, taken in connection with the accompanying drawings and detailed description, wherein like reference numerals represent like parts.

DETAILED DESCRIPTION

As described above, internal entity servers may receive requests to perform interactions from an external entity server outside of a firewall, and the internal entity server may request third-party applications outside of the firewall to provide information in order to validate data associated with the interaction. For example, in some embodiments, the interaction may include a new credit application submitted by of one or more users to the external entity server, which may be a public application (e.g., phone application, computer application, or website) owned by the internal entity server (e.g., a banking institution). Prior to authorizing the new credit application, the internal entity sever may instruct the external entity server to submit the user data and device data associated with the new credit application to the internal entity server so that various operations can be performed to authorize or deny the interaction (e.g., validations, quality checks, data enrichments, and processing). In some instances, the internal entity server may route the user data to a third-party application to verify aspects of the user data (e.g., asset values, confirmation of business operation, etc.).

One disadvantage of this process is that as the data is shared outside of the firewall (e.g., between the source and the internal entity server and between the internal entity server and the third-party applications), there is a chance that the data could be intercepted and interpreted by a bad actor. The provided systems and methods address the aforementioned issues, in part, by splitting the user data associated with the interaction into one or more logical data components and obfuscating the one or more logical data components into one or more unique identifiers. The one or more unique identifiers replace data associated with the interaction before sending an authentication response outside of the firewall. By doing this, even if a bad actor intercepts the authentication response and tries to interpret the data, the data is obfuscated by the unique identifiers and mitigates, or otherwise prevents, the bad actor from interpreting the data, thereby improving data security. Further, as will be detailed below, using the entity server to split the user data into one or more logical components prior to sending to the internal entity server improves the speed at which the internal entity server may process the user data to either authorize or deny the interaction.

Figure 1:
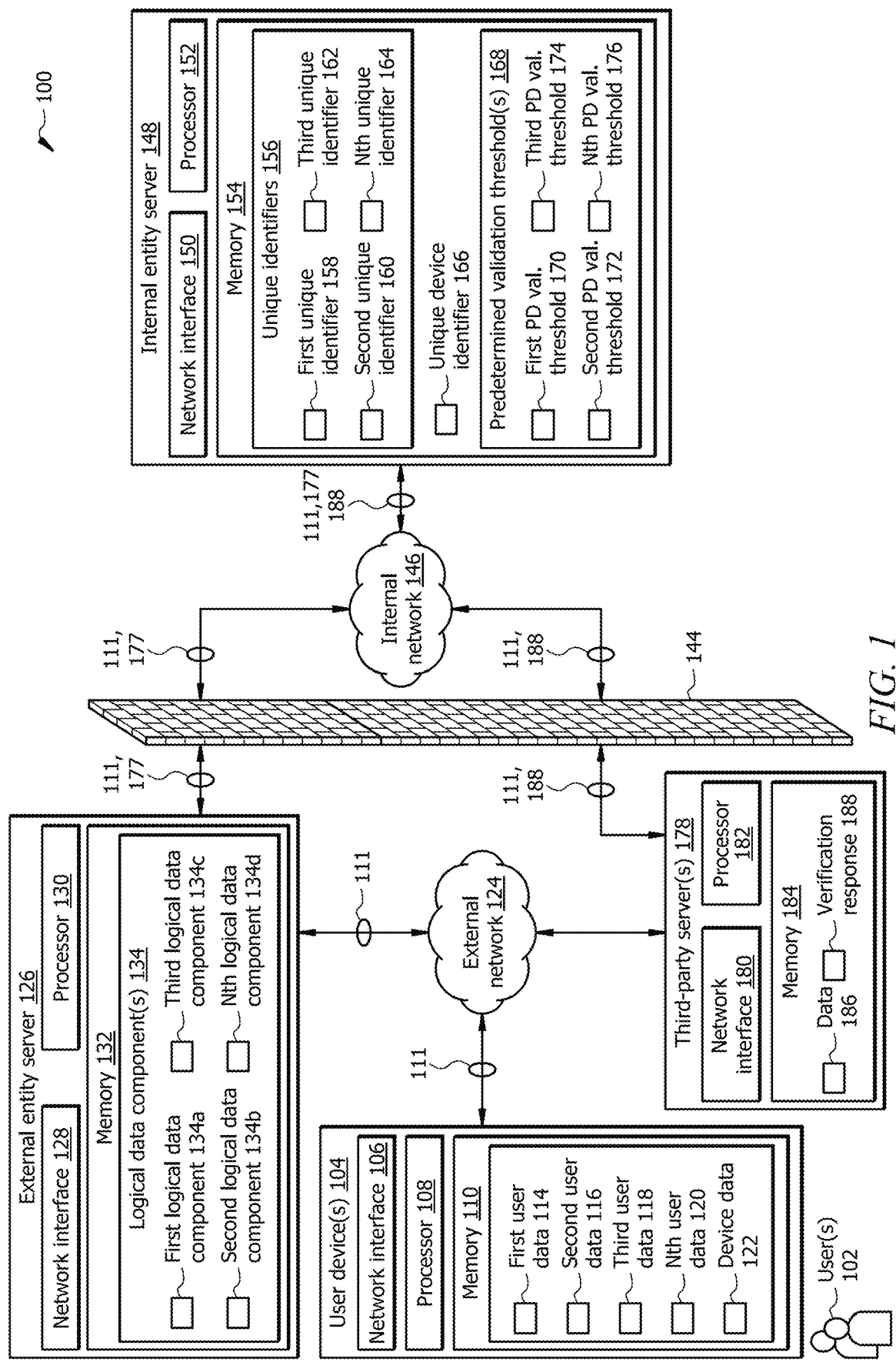
FIG. 1 illustrates a system according to an embodiment of the present disclosure.

System Overview:

FIG. 1 illustrates a system 100 according to some embodiments of the present disclosure that is configured to authorize or deny an external entity server 126 from performing an interaction. In some embodiments, the system 100 comprises a user device 104 operable to interact with one or more users 102, an external network 124, an external entity server 126, a firewall 144, an internal network 146, an internal entity server 148, and a third-party server 178. In general, the one or more users 102 may send a request 111 to the external entity server 126 to perform the interaction, where the request 111 includes user data 114-120 and device data 122 associated with the interaction. The external entity server 126 may receive the request and split the user data 114-120 into one or more logical data components 134, and transfer the one or more logical data components 134 to the internal entity server 148 through the firewall 144. The internal entity server 148 is configured to compare the one or more logical data components 134 to one or more predetermined validation thresholds 168. The internal entity server 148 is configured to determine whether the one or more logical data components 134 satisfy the one or more predetermined validation thresholds 168. In response to determining that the one or more logical data components 134 satisfy the one or more predetermined validation thresholds 168, the internal entity server 148 is configured to obfuscate the one or more logical data components 134 by generating one or more unique identifier 156 associated with the one or more logical data components 134. The internal entity server 148 is further configured to obfuscate the device data 122 by generating a unique device identifier 166 associated with the device data 122. The internal entity server 148 is further configured to generate an authentication response 177 that is configured to authorize the external entity server 126 to perform the interaction, wherein the authentication response 177 comprises the one or more unique identifiers 156 and the unique device identifier 166.

System Components of FIG. 1

User Device

User device 104 is generally any device configured to interact with one or more users 102. The user device 104 may be a mobile phone, a smartphone, an electronic tablet device, or a computer (e.g., personal computer, desktop, workstation, laptop). In some embodiments, the user device 104 is in signal communication with the external entity server 126 via the external network 124. The user device 104 is generally configured to receive data 112 associated with the interaction from the one or more users 102.

The user device 104 may include a network interface 106, a processor 108, and a memory 110. The network interface 106 is configured to enable wired and/or wireless communications between the external network 124 and the user device 104, as well as other components in the system 100. Suitable network interfaces 106 include an NFC interface, a Bluetooth interface, a Zigbee interface, a Z-wave interface, a radio-frequency identification (RFID) interface, a WIFI interface, a local area network (LAN) interface, a wide area network (WAN) interface, a metropolitan area network (MAN) interface, a personal area network (PAN) interface, a wireless PAN (WPAN) interface, a modem, a switch, and/or a router. The network interface 106 may be configured to use any suitable type of communication protocol as would be appreciated by one of ordinary skill in the art.

The memory 110 may be volatile or non-volatile and may comprise read-only memory (ROM), random-access memory (RAM), ternary content-addressable memory (TCAM), dynamic random-access memory (DRAM), and static random-access memory (SRAM). The memory 110 may include one or more of a local database, cloud database, network-attached storage (NAS), etc. The memory 110 comprises one or more disks, tape drives, or solid-state drives, and may be used as an over-flow data storage device, to store programs when such programs are selected for execution, and to store instructions and data that are read during program execution. The memory 110 may store data 112 associated with the interaction, along with any other data, instructions, logic, rules, or code operable to implement the function(s) described herein when executed by processor 108.

For example, in some embodiments, the interaction may be a new credit application submitted by the one or more users 102. For example, the new credit application could be a request on behalf of one or more users 102 to receive a loan for a new business venture. The data 112 associated with the interaction may include first user data 114, second user data 116, third user data 118, or data associated with any number of users 102 (e.g., $N^{th}$ user data 120). In some embodiments, each of the first user data 114, the second user data 116, the third user data 118, and the $N^{th}$ user data 120, respectively, may include one or more of: user identification data (e.g., user's full name, address, a user identification), asset information for each respective user 102 (e.g., user income, user's total assets, user's total debt, user's unused credit lines, projected business revenue), a credit score associated with the one or more users 102 (e.g., FICO® score, VantageScore, etc.), a risk assessment associated with the one or more users 102 (e.g., risk consortium analysis such as LexisNexis® Risk Solutions), tax data associated with the one or more users 102 (e.g., verification of tax income, profit and loss statements, filing for a loss, etc.).

The processor 108 of the user device 104 is configured to send a request 111 to the external entity server 126 via the external network 124 to perform the interaction. The request 111 may include user data 114-120 and device data 122 associated with the interaction. In some embodiments, the device data 122 includes, but is not limited to, one or more of: an IP address, a MAC address, a service identifier, a timestamp data, or digital fingerprint data. The processor 108 is any electronic circuitry, including, but not limited to, state machines, one or more central processing unit (CPU) chips, logic units, cores (e.g., a multi-core processor), field-programmable gate arrays (FPGAs), application-specific integrated circuits (ASICs), or digital signal processors (DSPs). For example, the processor 108 may be implemented in cloud devices, servers, virtual machines, and the like. The processor 108 may be a programmable logic device, a microcontroller, a microprocessor, or any suitable combination of the preceding. The processor 108 is configured to process data and may be implemented in hardware or software. For example, the processor 108 may be 8-bit, 16-bit, 32-bit, 64-bit, or of any other suitable architecture. The processor 108 may include an arithmetic logic unit (ALU) for performing arithmetic and logic operations, registers the supply operands to the ALU and store the results of ALU operations, and a control unit that fetches instructions from memory 110 and executes them by directing the coordinated operations of the ALU, registers and other components. The processor 108 is configured to implement various instructions described herein. For example, the processor 108 is configured to execute instructions from the memory 110 to implement the functions of the processor 108. In this way, processor 108 may be a special-purpose computer designed to implement the functions disclosed herein. In an embodiment, the processor 108 is implemented using logic units, FPGAs, ASICs, DSPs, or any other suitable hardware.

External Network

External network 124 may be any suitable type of wireless and/or wired network, including, but not limited to, all or a portion of the Internet, an Intranet, a private network, a public network, a peer-to-peer network, the public switched telephone network, a cellular network, a local area network (LAN), a metropolitan area network (MAN), a wide area network (WAN), and a satellite network. The external network 124 may be configured to support any suitable type of communication protocol as would be appreciated by one of ordinary skill in the art. In some embodiments, the external network 124 facilitates the transfer of data between the user device 104 and the external entity server 126.

External Entity Server

The external entity server 126 comprises a processor 130 operably coupled with a network interface 128 and a memory 132. The processor 130 is any electronic circuitry, including, but not limited to, state machines, one or more central processing unit (CPU) chips, logic units, cores (e.g., a multi-core processor), field-programmable gate arrays (FPGAs), application-specific integrated circuits (ASICs), or digital signal processors (DSPs). For example, one or more processors may be implemented in cloud devices, servers, virtual machines, and the like. The processor 130 may be a programmable logic device, a microcontroller, a microprocessor, or any suitable number and combination of the preceding. The one or more processors are configured to process data and may be implemented in hardware or software. For example, the processor 130 may be 8-bit, 16-bit, 32-bit, 64-bit, or of any other suitable architecture. The processor 130 may include an arithmetic logic unit (ALU) for performing arithmetic and logic operations. The processor 130 may register the supply operands to the ALU and store the results of ALU operations. The processor 130 may further include a control unit that fetches instructions from memory and executes them by directing the coordinated operations of the ALU, registers, and other components. The one or more processors are configured to implement various software instructions. In this way, processor 130 may be a special-purpose computer designed to implement the functions disclosed herein. In an embodiment, the processor 130 is implemented using logic units, FPGAs, ASICs, DSPs, or any other suitable hardware. The processor 130 is configured to operate as described in FIGS. 1-2. For example, the processor 130 may be configured to perform one or more operations of the operational flow 200 as described in FIG. 2.

In some embodiments, the processor 130 is configured to receive the request 111 from the one or more user devices 104 to perform the interaction. The processor 130 is further configured to split the user data 114-120 into one or more logical data components 134 (e.g., a first logical data component 134a, a second logical data component 134b, a third logical data component 134c, to an $N^{th}$ logical data component 134d). In some embodiments, the processor 130 is configured to receive the request 111 that includes user data 114-120 and device data 122 associated with the interaction, and the processor 130 is configured to identify, categorize, and/or organize the user data 114-120 into the one or more logical data components 134.

In some embodiments, the processor 130 may receive the user data 114-120 and split the user data 114-120 into a first logical data component 134a that includes user identification data (e.g., user's full name, address, a user identification). For example, the processor 130 may identify the user identification data within the user data 114-120, and split the user identification data from the user data 114-120 to generate the first logical data component 134a. In some embodiments, the processor 130 may receive the user data 114-120 and split the user data 114-120 into a second logical data component 134b that includes asset information for one or more user 102 (e.g., user's income, user's total assets, user's total debt, user's unused credit lines, projected business revenue). For example, the processor 130 may identify the asset information for each respective user 102 within the user data 114-120 to generate the second logical data component 134b. In some embodiments, the processor 130 may receive the user data 114-120 and split the user data 114-120 into a third logical data component 134c that includes a credit score associated with the one or more users 102 (e.g., FICO® score, VantageScore). For example, the processor 130 may identify a credit score associated with the one or more users 102 within the user data 114-120 to generate the third logical data component 134c. In some embodiments, the processor 130 may receive the user data 114-120 and split the user data 114-120 into an Nth logical data component 134d (e.g., a fourth logical data component and/or a fifth logical data component). In some embodiments, the processor 130 may identify user identification data within the user data 114-120, and utilize the user identification data to perform the risk assessment using a third-party application (e.g., LexisNexis® Risk Solutions). For example, the user's 102 name may be used by the third-party application to detect fraud, financial crime compliance, and/or to identify creditworthy prospects that are not credit active. The results from the risk assessment may be split, using the processor 130, into the fourth logical data component. In some embodiments, the processor 130 may identify tax data associated with the one or more users 102 within the data to generate the fifth logical data component that includes tax data associated with the one or more users 102.

The network interface 128 is configured to enable wired and/or wireless communications between the external entity server 126 and the firewall 144, the internal network 146, and the internal entity server 148, as well as other components in the system 100. Suitable network interfaces 128 include an NFC interface, a Bluetooth interface, a Zigbee interface, a Z-wave interface, a radio-frequency identification (RFID) interface, a WIFI interface, a local area network (LAN) interface, a wide area network (WAN) interface, a metropolitan area network (MAN) interface, a personal area network (PAN) interface, a wireless PAN (WPAN) interface, a modem, a switch, and/or a router. The network interface 128 may be configured to use any suitable type of communication protocol as would be appreciated by one of ordinary skill in the art.

The memory 132 may be volatile or non-volatile and may comprise read-only memory (ROM), random-access memory (RAM), ternary content-addressable memory (TCAM), dynamic random-access memory (DRAM), and static random-access memory (SRAM). The memory 132 may include one or more of a local database, cloud database, network-attached storage (NAS), etc. The memory 132 comprises one or more disks, tape drives, or solid-state drives, and may be used as an over-flow data storage device, to store programs when such programs are selected for execution, and to store instructions and data that are read during program execution. The memory 132 may store any of the information described in FIGS. 1-2 along with any other data, instructions, logic, rules, or code operable to implement the function(s) described herein when executed by processor 130. For example, the memory 132 is operable to store the first logical data component 134*a*, the second logical data component 134*b*, the third logical data component 134*c*, and the N$^{th}$ logical data component 134*d*.

Third-Party Server

The third-party server 178 comprises a processor 182 operably coupled to a network interface 180 and a memory 184. The processor 182 is any electronic circuitry, including, but not limited to, state machines, one or more central processing unit (CPU) chips, logic units, cores (e.g., a multi-core processor), field-programmable gate arrays (FPGAs), application-specific integrated circuits (ASICs), or digital signal processors (DSPs). For example, one or more processors may be implemented in cloud devices, servers, virtual machines, and the like. The processor 182 may be a programmable logic device, a microcontroller, a microprocessor, or any suitable number and combination of the preceding. The one or more processors are configured to process data and may be implemented in hardware or software. For example, the processor 182 may be 8-bit, 16-bit, 32-bit, 64-bit, or of any other suitable architecture. The processor 182 may include an arithmetic logic unit (ALU) for performing arithmetic and logic operations. The processor 182 may register the supply operands to the ALU and store the results of ALU operations. The processor 182 may further include a control unit that fetches instructions from memory and executes them by directing the coordinated operations of the ALU, registers, and other components. The one or more processors are configured to implement various software instructions. In this way, processor 182 may be a special-purpose computer designed to implement the functions disclosed herein. In an embodiment, the processor 182 is implemented using logic units, FPGAs, ASICs, DSPs, or any other suitable hardware. The processor 182 is configured to operate as described in FIGS. 1-2. For example, the processor 182 may be configured to perform one or more operations of the operational flow 200 as described in FIG. 2.

In general, the third-party server 178 is be configured to verify the one or more logical data components 134 upon request by the internal entity server 148. For example, the internal entity server 148 is generally configured to process the one or more logical data components 134 received from the external entity server 126 to determine if the logical data components 134 satisfy one or more predetermined validation thresholds 168. If the logical data components 134 satisfy the predetermined validation thresholds 168, the internal entity server 148 may authorize the external entity server 126 to perform the interaction. In some embodiments, prior to comparing the logical data components 134 to the predetermined validation thresholds 168, the internal entity server 148 may request the third-party server 178 to verify the data and/or information associated with one or more of the logical data components 134.

In some embodiments, the processor 182 of the third-party server 178 may be configured to verify first logical data component 134*a*, which includes the user identification data (e.g., user's full name, address, or combination thereof). In one example, the third-party server 178 may be a background check application (e.g., IntelliCorp, GoodHire, Checkr), where the processor 182 is configured to verify one or more aspect of the user identification data by comparing the user identification data to data 186 (e.g., legal name of user, address of user, or combinations thereof) stored on or retrieved by the third-party server. In some embodiments, the processor 182 is configured to verify the second logical data component 134*b*, which includes asset information for each respective user 102 (e.g., user's income, user's total assets, user's total debt, user's unused credit lines). For example, the third-party server 178 may be a banking institution associated with the user 102, and the processor 182 may verify the asset information by comparing one or more aspect of the asset information to data 186 (e.g., recent bank statements, W-2 forms, paystubs, or combinations thereof) stored on or retrieved by the third-party server 178. In some embodiments, the processor 182 is configured to verify the third logical data component 134*c*, which includes a credit score associated with one or more users 102. For example, the third-party server 178 may be an application configured to verify credit (e.g., Equifax, Experian, Transunion), where the processor 182 is configured to compare the credit score to data 186 (e.g., credit score) stored on or retrieved by the third-party server 178. In some embodiments, the processor 182 is configured to generate a verification response 188 after determining that the one or more logical data component 134 corresponds to the data 186 stored on or retrieved by the third-party server 178.

The network interface 180 is configured to enable wired and/or wireless communications between the third-party server 178 and the firewall 144, the internal network 146, and the internal entity server 148, as well as other components in the system 100. Suitable network interfaces 180 include an NFC interface, a Bluetooth interface, a Zigbee interface, a Z-wave interface, a radio-frequency identification (RFID) interface, a WIFI interface, a local area network (LAN) interface, a wide area network (WAN) interface, a metropolitan area network (MAN) interface, a personal area network (PAN) interface, a wireless PAN (WPAN) interface, a modem, a switch, and/or a router. The network interface 180 may be configured to use any suitable type of communication protocol as would be appreciated by one of ordinary skill in the art.

The memory 184 may be volatile or non-volatile and may comprise read-only memory (ROM), random-access memory (RAM), ternary content-addressable memory (TCAM), dynamic random-access memory (DRAM), and static random-access memory (SRAM). The memory 184 may include one or more of a local database, cloud database, network-attached storage (NAS), etc. The memory 184 comprises one or more disks, tape drives, or solid-state drives, and may be used as an over-flow data storage device, to store programs when such programs are selected for execution, and to store instructions and data that are read during program execution. The memory 184 may store any of the information described in FIGS. 1-2 along with any other data, instructions, logic, rules, or code operable to implement the function(s) described herein when executed by processor 182. For example, the memory 184 is operable to store the data 186 and the verification response 188.

Firewall

In some embodiments, the system 100 includes a firewall 144 positioned between the external entity server 126 and the internal network 146. In some embodiments, the firewall 144 is configured to operate according to a defined set of rules and/or security thresholds that permit or deny certain types of network traffic to flow between the external entity server 126 and the internal network 146. In some embodiments, the rules are configured to allow desirable network traffic to flow between the external entity server 126 and the internal network 146, and the rules may exclude any network traffic that may pose a security threat to the internal network 146. Examples of network traffic that should be excluded includes malware, viruses, worms, malicious code, certain cookies, spam, blocked websites, and the like. Suitable firewalls 144 include, but are not limited to, packet filters, circuit-level gateways, application layer filters, a stateful inspection firewall, or next-generation firewall.

Internal Network

Internal network 146 may be any suitable type of wireless and/or wired network, including, but not limited to, all or a portion of the Internet, an Intranet, a private network, a public network, a peer-to-peer network, the public switched telephone network, a cellular network, a local area network (LAN), a metropolitan area network (MAN), a wide area network (WAN), and a satellite network. The internal network 146 may be configured to support any suitable type of communication protocol as would be appreciated by one of ordinary skill in the art. In some embodiments, the internal network 146 facilitates the transfer of data between the external entity server 126 and the internal entity server 148, and the third-party servers 178 and the internal entity server 148.

Internal Entity Server

The internal entity server 148 comprises a processor 152 operably coupled with a network interface 150 and a memory 154. The processor 152 is any electronic circuitry, including, but not limited to, state machines, one or more central processing unit (CPU) chips, logic units, cores (e.g., a multi-core processor), field-programmable gate arrays (FPGAs), application-specific integrated circuits (ASICs), or digital signal processors (DSPs). For example, one or more processors may be implemented in cloud devices, servers, virtual machines, and the like. The processor 152 may be a programmable logic device, a microcontroller, a microprocessor, or any suitable number and combination of the preceding. The one or more processors are configured to process data and may be implemented in hardware or software. For example, the processor 152 may be 8-bit, 16-bit, 32-bit, 64-bit, or of any other suitable architecture.

The processor 152 may include an arithmetic logic unit (ALU) for performing arithmetic and logic operations. The processor 152 may register the supply operands to the ALU and store the results of ALU operations. The processor 152 may further include a control unit that fetches instructions from memory and executes them by directing the coordinated operations of the ALU, registers, and other components. The one or more processors are configured to implement various software instructions. In this way, processor 152 may be a special-purpose computer designed to implement the functions disclosed herein. In an embodiment, the processor 152 is implemented using logic units, FPGAs, ASICs, DSPs, or any other suitable hardware. The processor 152 is configured to operate as described in FIGS. 1-2. For example, the processor 152 may be configured to perform one or more operations of the operational flow 200 as described in FIG. 2.

In some embodiments, the processor 152 is configured to receive the request 111 to perform the interaction from the external entity server 126 via the internal network 146. The request 111 to perform the interaction may include the one or more logical data components 134 generated by the external entity server 126 and device data 122. The processor 152 is configured to compare the one or more logical data components 134 to the one or more predetermined thresholds 168 to determine whether the one or more logical data components 134 satisfy the one or more predetermined validation thresholds 168.

For example, the processor 152 may compare the first logical data component 134a to a first predetermined validation threshold 170. In the example where the first logical data component 134a is user identification data, the first predetermined validation threshold 170 may include data associated with the user that is stored on the internal entity server 148 or that is provided to the internal entity server 148 by the third-party server 178. The processor 152 may determine that the first logical data component 134a satisfies the first predetermined validation threshold 170 if the first logical data component 134a matches the first predetermined validation threshold 170 (e.g., the user's full name in the request 111 matches the user's full name in the first predetermined validation threshold 170).

In another example, the processor 152 may compare the second logical data component 134b to a second predetermined validation threshold 172. In the example where the second logical data component 134b includes asset information for one or more user 102, the second predetermined validation threshold 172 may include a threshold income, threshold total asset value, threshold debt value for the specific interaction (e.g., new credit application). The processor 152 may determine that the second logical data component 134b satisfies the second predetermined validation threshold 172 if the second logical data component 134b exceeds the second predetermined validation threshold 172.

In yet another example, the processor 152 may compare the third logical data component 134c to a third predetermined validation threshold 174. In the example where the third logical data component 134c includes a credit score associated with the one or more users 102, the third predetermined validation threshold 174 may include a threshold credit score for the specific interaction (e.g., new credit application). The processor 152 may determine that the third logical data component 134c satisfies the third predetermined validation threshold 174 if the third logical data component 134c exceeds the third predetermined validation threshold 174.

In another example, the processor 152 may compare the $N^{th}$ logical data component 134d to an $N^{th}$ predetermined validation threshold 176. In one example where the $N^{th}$ logical data component 134d includes a risk assessment configured to detect fraud and financial fraud compliance, the $N^{th}$ predetermined validation threshold 176 may include a threshold risk value for the specific interaction. For example, the processor 152 may determine that the $N^{th}$ logical data component 134d satisfies the $N^{th}$ predetermined validation threshold 176 if the $N^{th}$ logical data component 134d is below the $N^{th}$ predetermined validation threshold 176 (e.g., no fraud detected). In another example where the $N^{th}$ logical data component 134d includes tax data, the $N^{th}$ predetermined validation threshold 176 may include a threshold profit-and-loss value. In alternative embodiments, the processor 152 may determine that the $N^{th}$ logical data component 134d satisfies the $N^{th}$ predetermined validation threshold if the $N^{th}$ logical data component 134d is above the $N^{th}$ predetermined validation threshold 176 (e.g., above the threshold profit-and-loss value).

In response to determining that the one or more logical data components 134 satisfy the one or more of the predetermined validation thresholds 168, the processor 152 is configured to obfuscate the one or more logical data components 134 by generating one or more unique identifiers 156 associated with the one or more logical data components 134. In some embodiments, in response to determining that the one or more logical data components 134 satisfy the one or more predetermined validation thresholds 168, the processor 152 is further configured to obfuscate the device data 122 associated with the user device 104 by generating a unique device identifier 166.

In some embodiments, the processor 152 may generate one or more unique identifiers 156 and/or unique device identifier 166 by using a hashing function. For example, the processor 152 may apply the hashing function to the one or more logical data components 134 to generate the one or more unique identifiers 156, and the processor 152 may apply the hashing function to the device data 122 to generate the unique device identifier 166. The one or more unique identifiers 156 and/or the unique device identifier 166 may include a string or number of fixed length that is generated as a result of the hashing function. Any suitable hashing function may be used including, but not limited to, MD5 hash functions, SHA-0 hash functions, SHA-1 hash functions, SHA-2 hash functions, SHA-3 hash functions, and the like.

In some embodiments, the processor 152 is configured to generate an authentication response 177 configured to authorize the external entity server 126 to perform the interaction (e.g., approve the new credit application). The authentication response 177 may include the one or more unique identifiers 156 and the unique device identifier 166. By doing this, the processor 152 may encrypt the data within the one or more logical data components 134 and the device data 122 (e.g., service identifier of the user 102 who sent the request 111 to perform the interaction, a timestamp associated with the request, user device 104 fingerprint, application service ID, etc.) and mitigate the likelihood that a bad actor can interpret the data.

The network interface 150 is configured to enable wired and/or wireless communications between the internal entity server 148 and the internal network 146, as well as other components in the system 100. Suitable network interfaces 150 include an NFC interface, a Bluetooth interface, a Zigbee interface, a Z-wave interface, a radio-frequency identification (RFID) interface, a WIFI interface, a local area network (LAN) interface, a wide area network (WAN) interface, a metropolitan area network (MAN) interface, a personal area network (PAN) interface, a wireless PAN (WPAN) interface, a modem, a switch, and/or a router. The network interface 150 may be configured to use any suitable type of communication protocol as would be appreciated by one of ordinary skill in the art.

The memory 154 may be volatile or non-volatile and may comprise read-only memory (ROM), random-access memory (RAM), ternary content-addressable memory (TCAM), dynamic random-access memory (DRAM), and static random-access memory (SRAM). The memory 154 may include one or more of a local database, cloud database, network-attached storage (NAS), etc. The memory 154 comprises one or more disks, tape drives, or solid-state drives, and may be used as an over-flow data storage device, to store programs when such programs are selected for execution, and to store instructions and data that are read during program execution. The memory 154 may store any of the information described in FIGS. 1-2 along with any other data, instructions, logic, rules, or code operable to implement the function(s) described herein when executed by processor 152. For example, the memory 154 is operable to store the one or more unique identifiers 156 (e.g., a first unique identifier 158, a second unique identifier 160, a third unique identifier 162, and the Nth unique identifier 164), the unique device identifier 166, and the one or more predetermined validation thresholds 168 (e.g., a first predetermined validation threshold 170, a second predetermined validation threshold 172, a third predetermined validation threshold 174, and the Nth predetermined validation threshold 176).

Example Operation

Figure 2:
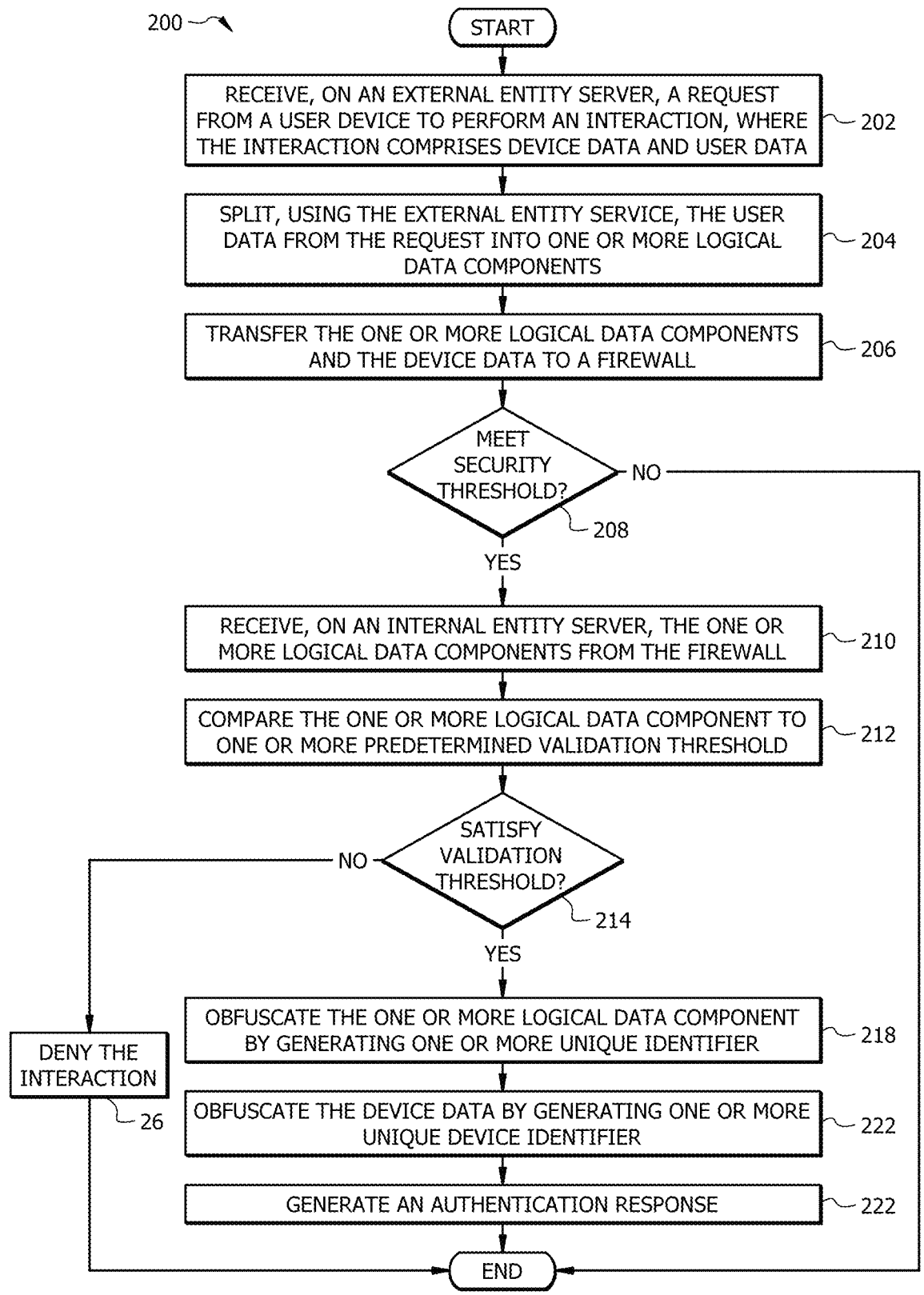
FIG. 2 illustrates a flowchart of one embodiment of a method of operating the system of FIG. 1.

FIG. 2 illustrates an operational flow 200 according to one embodiment of the present disclosure. The operational flow 200 can be logically described in two parts. The first part includes operations 202-208, which generally include receiving a request 111 from a user device 104 on the external entity server 126 to perform an interaction (e.g., a new credit application on behalf of one or more users 102) where the request 111 includes user data 114-120 and device data 122 associated with the interaction. The first part further includes splitting the user data 114-120 from the request 111 into one or more logical data components 134 using the external entity server 126, transferring the one or more logical data components 134 to the firewall 144, and determining whether the one or more logical data components 134 meets the security threshold of the firewall 144. If the one or more logical data components 134 do not meet the security threshold of the firewall 144, the firewall 144 may block the one or more logical data components 134 from entering the internal network 146, and the operational flow 300 may end. If the one or more logical data components 134 do meet the security threshold of the firewall 144, the operational flow may proceed to the second part.

The second part generally includes receiving the one or more logical data components 134 on the internal entity server 148 via the internal network 146, comparing the one or more logical data components 134 to one or more predetermined validation threshold 168, and determining whether the one or more logical data components 134 satisfy the one or more predetermined validation threshold 168. If the one or more logical data components 134 do not satisfy the one or more predetermined validation threshold 168, the operational flow 200 further includes denying the request 111 to perform the interaction. If the one or more logical data components 134 do satisfy the one or more predetermined validation threshold 168, the operational flow 200 includes authorizing the request 111 to perform the interaction. Once the operational flow 200 authorizes the request 111, the operational flow may proceed to the third part.

The third part generally includes obfuscating the one or more logical data component 134 to generate one or more unique identifier 156, and obfuscating the device data 122 to generate one or more unique device identifier 166. The third part further includes generating an authentication response 177 that includes the one or more unique identifier 156 and the unique device identifier 166.

At operation 202, the operational flow 200 includes receiving a request 111 on the external entity server 126 from the one or more user devices 104 to perform the interaction. In some embodiments, the interaction may be a new credit application submitted by the one or more users 102. For example, the new credit application could be a request on behalf of one or more users 102 to receive a loan for a new business venture. In some embodiments, the request 111 to perform the interaction may include user data 114-120 and device data 122 associated with the interaction. The data 112 associated with the interaction may include first user data 114, second user data 116, third user data 118, or data associated with any number of users 102 (e.g., N$^{th}$ user data 120). In some embodiments, each of the first user data 114, the second user data 116, the third user data 118, and the N$^{th}$ user data 120, respectively, may include one or more of: user identification data (e.g., user's full name, address, a user identification), asset information for each respective user 102 (e.g., user income, user's total assets, user's total debt, user's unused credit lines, projected business revenue), a credit score associated with the one or more users 102 (e.g., FICO® score, VantageScore, etc.), a risk assessment associated with the one or more users 102 (e.g., risk consortium analysis such as LexisNexis® Risk Solutions), tax data associated with the one or more users 102 (e.g., verification of tax income, profit and loss statements, filing for a loss, etc.). In some embodiments, the device data 122 includes, but is not limited to, one or more of: an IP address, a MAC address, a service identifier, timestamp data, or digital fingerprint data.

At operation 204, the operational flow 200 includes using the external entity server 126 to split the user data 114-120 into one or more logical data components 134 (e.g., a first logical data component 134a, a second logical data component 134b, a third logical data component 134c, to an N$^{th}$ logical data component 134d). In some embodiments, the external entity server 126 may receive the user data 114-120 and split the user data 114-120 into a first logical data component 134a that includes user identification data (e.g., user's full name, address, a user identification). For example, the external entity server 126 may identify the user identification data within the user data 114-120, and split the user identification data from the user data 114-120 to generate the first logical data component 134a. In some embodiments, the external entity server 126 may receive the user data 114-120 and split the user data 114-120 into a second logical data component 134b that includes asset information for one or more user 102 (e.g., user's income, user's total assets, user's total debt, user's unused credit lines, projected business revenue). For example, external entity server 126 may identify the asset information for each respective user 102 within the user data 114-120 to generate the second logical data component 134b. In some embodiments, external entity server 126 may receive the user data 114-120 and split the user data 114-120 into a third logical data component 134c that includes a credit score associated with the one or more users 102 (e.g., FICO® score, VantageScore). For example, the external entity server 126 may identify a credit score associated with the one or more users 102 within the user data 114-120 to generate the third logical data component 134c. In some embodiments, external entity server 126 may receive the user data 114-120 and split the user data 114-120 into an Nth logical data component 134d (e.g., a fourth logical data component and/or a fifth logical data component). In some embodiments, the external entity server 126 may identify user identification data within the user data 114-120, and utilize the user identification data to perform the risk assessment using a third-party application (e.g., LexisNexis® Risk Solutions). For example, the user's 102 name may be used by the third-party application to detect fraud, financial crime compliance, and/or to identify creditworthy prospects that are not credit active. The results from the risk assessment may be split, using the external entity server 126, into the fourth logical data component. In some embodiments, the external entity server 126 may identify tax data associated with the one or more users 102 within the data to generate the fifth logical data component that includes tax data associated with the one or more users 102.

At operation 206, the operational flow 200 may include transferring the one or more logical data components 134 and the device data 122 to the firewall 144. In some embodiments, the firewall 144 is configured to operate according to a defined set of rules and/or security thresholds that permit or deny certain types of network traffic to flow between the external entity server 126 and the internal network 146. In some embodiments, the rules are configured to allow desirable network traffic to flow between the external entity server 126 and the internal network 146, and the rules may exclude any network traffic that may pose a security threat to the internal network 146. At decision block 208, the operational flow 200 includes determining whether the one or more logical data components 134 and/or the device data 122 meets the security threshold of the firewall 144. For example, if the firewall 144 detects includes malware, viruses, worms, malicious code, certain cookies, spam, blocked websites, and the like then the firewall may block the transfer of data to the internal network 146 and end the operational flow 200. If the one or more logical data components 134 and/or the device data 122 meets the security threshold of the firewall 144, the operational flow 200 proceeds to operation 210.

At operation 210, the operational flow 200 includes receiving the one or more logical data components 134 and the device data 122 on the internal entity server 148 via the internal network 146. At operation 212, the operational flow 200 includes comparing the one or more logical data components 134 to one or more predetermined validation thresholds 168. At decision block 214, the operational flow 200 includes determining whether the one or more logical data components 134 satisfy the one or more predetermined validation thresholds 168.

For example, the internal entity server 148 may compare the first logical data component 134a to a first predetermined threshold 170. In the example where the first logical data component 134a is user identification data, the first predetermined validation threshold 170 may include data associated with the user that is stored on the internal entity server 148 or that is provided to the internal entity server 148 by the third-party server 178. The internal entity server 148 may determine that the first logical data component 134a satisfies the first predetermined validation threshold 170 if the first logical data component 134a matches the first predetermined validation threshold 170 (e.g., the user's full name in the request 111 matches the user's full name in the first predetermined threshold 170).

In another example, the internal entity server 148 may compare the second logical data component 134b to a second predetermined validation threshold 172. In the example where the second logical data component 134b includes asset information for one or more user 102, the second predetermined validation threshold 172 may include a threshold income, threshold total asset value, threshold debt value for the specific interaction (e.g., new credit application). The internal entity server 148 may determine that the second logical data component 134b satisfies the second predetermined validation threshold 172 if the second logical data component 134b exceeds the second predetermined validation threshold 172.

In yet another example, the internal entity server 148 may compare the third logical data component 134c to a third predetermined validation threshold 174. In the example where the third logical data component 134c includes a credit score associated with the one or more users 102, the third predetermined validation threshold 174 may include a threshold credit score for the specific interaction (e.g., new credit application). The internal entity server 148 may determine that the third logical data component 134c satisfies the third predetermined validation threshold 174 if the third logical data component 134c exceeds the third predetermined validation threshold 174.

In another example, the internal entity server 148 may compare the $N^{th}$ logical data component 134d to an $N^{th}$ predetermined validation threshold 176. In one example where the $N^{th}$ logical data component 134d includes a risk assessment configured to detect fraud and financial fraud compliance, the $N^{th}$ predetermined validation threshold 176 may include a threshold risk value for the specific interaction. For example, the internal entity server 148 may determine that the $N^{th}$ logical data component 134d satisfies the $N^{th}$ predetermined validation threshold 176 if the $N^{th}$ logical data component 134d is below the $N^{th}$ predetermined validation threshold 176 (e.g., no fraud detected). In some embodiments, the internal entity server 148 may request the third-party server 178 to verify the $N^{th}$ logical data component 134d, and the third-party server 178 may be configured to send a verification response 188 that includes whether or not the $N^{th}$ logical data component 134d contains fraud. In another example where the $N^{th}$ logical data component 134d includes tax data, the $N^{th}$ predetermined validation threshold 176 may include a threshold profit-and-loss value. In alternative embodiments, the internal entity server 148 may determine that the $N^{th}$ logical data component 134d satisfies the $N^{th}$ predetermined validation threshold if the $N^{th}$ logical data component 134d is above the $N^{th}$ predetermined validation threshold 176 (e.g., above the threshold profit-and-loss value). Similarly, the internal entity server 148 may request the third-party server 178 to verify the profit-and-loss value in the verification response 188.

In response to determining that the one or more logical data component 134 does not satisfy the one or more predetermined validation threshold 168, the internal entity server 148 may deny the interaction at operation 216 and the operational flow 200 may end. In response to determining that the one or more logical data component 134 does satisfy the one or more predetermined validation threshold 168, the internal entity server 148 may proceed to operation 218. At operation 218, the operational flow 200 includes using the internal entity server 148 to obfuscate the one or more logical data components 134 by generating one or more unique identifiers 156 associated with the one or more logical data components 134 (e.g., a first unique identifier 158, a second unique identifier 160, a third unique identifier 162, and an $N^{th}$ unique identifier 164). At operation 22, the operational flow 200 includes obfuscating the device data 122 associated with the user device 104 by generating a unique device identifier 166. In some embodiments, the internal entity server 148 may generate one or more unique identifiers 156 and/or unique device identifier 166 by using a hashing function. For example, the internal entity server 148 may apply the hashing function to the one or more logical data components 134 to generate the one or more unique identifiers 156, and the internal entity server 148 may apply the hashing function to the device data 122 to generate the unique device identifier 166. The one or more unique identifiers 156 and/or the unique device identifier 166 may include a string or number of fixed length that is generated as a result of the hashing function. Any suitable hashing function may be used including, but not limited to, MD5 hash functions, SHA-0 hash functions, SHA-1 hash functions, SHA-2 hash functions, SHA-3 hash functions, and the like.

In some embodiments, the internal entity server 148 may periodically generate an altered unique identifier for the one or more unique identifiers 156 (e.g., the first unique identifier 158, the second unique identifier 160, the third unique identifier 162, and the $N^{th}$ unique identifier 164). The internal entity server 148 may map the altered unique identifier to the previous unique identifier 156 such that there is a correlation between the altered unique identifier and the previous unique identifier 156. For example, the internal entity server 148 may use a hashing function to generate a new binary bit string and establish a mapping between the new binary bit string and the previous binary bit string.

At operation 222, the operational flow 200 includes using the internal entity server 148 to generate an authentication response 177 configured to authorize the external entity server 126 to perform the interaction (e.g., approve the new credit application). The authentication response 177 may include the one or more unique identifiers 156 and the unique device identifier 166. By doing this, the internal entity server 148 may encrypt the data within the one or more logical data components 134 and the device data 122 (e.g., service identifier of the user 102 who sent the request 111 to perform the interaction, a timestamp associated with the request, user device 104 fingerprint, application service ID, etc.) and mitigate the likelihood that a bad actor can interpret the data. In some embodiments, the external entity server 126 may receive the authentication response 177 and perform the interaction.

While several embodiments have been provided in the present disclosure, it should be understood that the disclosed systems and methods might be embodied in many other specific forms without departing from the spirit or scope of the present disclosure. The present examples are to be considered as illustrative and not restrictive, and the intention is not to be limited to the details given herein. For example, the various elements or components may be combined or integrated with another system or certain features may be omitted, or not implemented.

In addition, techniques, systems, subsystems, and methods described and illustrated in the various embodiments as discrete or separate may be combined or integrated with other systems, modules, techniques, or methods without departing from the scope of the present disclosure. Other items shown or discussed as coupled or directly coupled or communicating with each other may be indirectly coupled or communicating through some interface, device, or intermediate component whether electrically, mechanically, or otherwise. Other examples of changes, substitutions, and alterations are ascertainable by one skilled in the art and could be made without departing from the spirit and scope disclosed herein.

The invention claimed is:

1. A system comprising:
an external entity server;
an internal entity server communicatively coupled to the external entity server and separated by a firewall; and
wherein the external entity server comprises a first processor configured to:
receive a request to perform an interaction, wherein the request comprises user data and device data;
split the user data into one or more logical data components, wherein the one or more logical data components comprise at least a first logical data component and a second logical data component; and
transfer at least the first logical data component, the second logical data component, and the device data to the internal entity server through the firewall;
wherein the internal entity server comprises:
a memory operable to store at least a first predetermined validation threshold and a second predetermined validation threshold;
a second processor operably coupled to the memory, wherein the second processor is configured to:
compare the first logical data component to the first predetermined validation threshold;
compare the second logical data component to the second predetermined validation threshold;
determine whether the first logical data component and the second logical data component satisfy the first predetermined validation threshold and the second predetermined validation threshold, respectively; and
in response to determining that the first logical data component and the second logical data component satisfy the first predetermined validation threshold and the second predetermined validation threshold, respectively, the second processor is configured to:
obfuscate the first logical data component by generating a first unique identifier associated with the first logical data component;
obfuscate the second logical data component by generating a second unique identifier associated with the second logical data component;
obfuscate the device data by generating a unique device identifier associated with the device data; and
generate an authentication response configured to authorize the external entity server to perform the interaction, wherein the authentication response comprises the first unique identifier, the second unique identifier, and the unique device identifier.

2. The system of claim 1, wherein the second processor of the internal entity server is further configured to:
communicate the authentication response to the external entity server; and
in response to receiving the authentication response, the first processor of the external entity server is configured to perform the interaction.

3. The system of claim 1, wherein if the first logical data component and the second logical data component do not satisfy the first predetermined validation threshold and the second predetermined validation threshold, respectively, the second processor is configured to deny the interaction; and
in response to determining that the first logical data component and the second logical data component are not validated, the second processor is configured to:
generate the authentication response, wherein the authentication response is configured to deny the external entity server from performing the interaction.

4. The system of claim 1, wherein the first processor of the external entity server is further configured to:
split the user data into a third logical data component;
transfer the third logical data component to the firewall;
wherein the memory of the internal entity server is further operable to store a third predetermined validation threshold;
wherein the second processor of the internal entity server is further configured to:
compare the third logical data component to the third predetermined validation threshold;
determine whether the third logical data component is validated, wherein if the third logical data component satisfies the third predetermined validation threshold, the second processor is further configured to authorize the interaction; and
in response to determining that the third logical data component is validated, the second processor is further configured to:
obfuscate the third logical data component by generating a third unique identifier associated with the third logical data component; and
generate the authentication response configured to authorize the external entity server to perform the interaction, wherein the authentication response further comprises the third unique identifier.

5. The system of claim 1, wherein the second processor is further configured to:
periodically generate an altered unique identifier for at least the first unique identifier; and
map the altered unique identifier to the first unique identifier such that there is a correlation between the altered unique identifier and the first unique identifier.

6. The system of claim 1, wherein the first logical data component comprises one or more of: user identification data, asset information associated with one or more users, a risk assessment associated with the one or more users, a credit score associated with the one or more users, or a tax assessment associated with the one or more users.

7. The system of claim 1, wherein the device data comprises one or more of: an IP address, a MAC address, a service identifier, timestamp data, or digital fingerprint data.

8. A method comprising:
receiving, on an external entity server, a request to perform an interaction, wherein the interaction comprises user data and device data;
split, using the external entity server, the user data into one or more logical data components, wherein the one or more logical data components comprise at least a first logical data component and a second logical data component;
transfer, using the external entity server, at least the first logical data component, the second logical data component, and the device data to an internal entity server through a firewall;
comparing, using the internal entity server, the first logical data component to a first predetermined validation threshold;

comparing, using the internal entity server the second logical data component to a second predetermined validation threshold;

determining whether the first logical data component and the second logical data component satisfy the first predetermined validation threshold and the second predetermined validation threshold, respectively, and in response to determining that the first logical data component and the second logical data component satisfy the first predetermined validation threshold and the second predetermined validation threshold, respectively, the method further comprises:

obfuscating the first logical data component by generating a first unique identifier associated with the first logical data component;

obfuscating the second logical data component by generating a second unique identifier associated with the second logical data component;

obfuscating the device data by generating a unique device identifier associated with the device data; and generating an authentication response configured to authorize the external entity server to perform the interaction, wherein the authentication response comprises the first unique identifier, the second unique identifier, and the unique device identifier.

9. The method of claim 8 further comprising:

communicating, using the internal entity server, the authentication response to the external entity server; and performing the interaction using the external entity server.

10. The method of claim 8, wherein if the first logical data component and the second logical data component do not satisfy the first predetermined validation threshold and the second predetermined validation threshold, respectively, the internal entity server is configured to deny the interaction, and in response to determining that the first logical data component and the second logical data component are not validated, the method further comprises:

generating the authentication response, wherein the authentication response is configured to deny the external entity server from performing the interaction.

11. The method of claim 8 further comprises:

splitting, using the external entity server, the user data into a third logical data component;

transferring, using the external entity server, the third logical data component through the firewall to the internal entity server;

comparing, using the internal entity server, the third logical data component to a third predetermined validation threshold;

determining, using the internal entity server, whether the third logical data component is validated, wherein if the third logical data component satisfies the third predetermined validation threshold, the internal entity server is further configured to authorize the interaction; and in response to determining that the third logical data component is validated, the method further comprises:

obfuscating, using the internal entity server, the third logical data component by generating a third unique identifier associated with the third logical data component; and generating, using the internal entity server, the authentication response configured to authorize the external entity server to perform the interaction, wherein the authentication response further comprises the third unique identifier.

12. The method of claim 8 further comprising:

periodically generating, using the internal entity server, an altered unique identifier for at least the first unique identifier; and mapping, using the internal entity server, the altered unique identifier to the first unique identifier such that there is a correlation between the altered unique identifier and the first unique identifier.

13. The method of claim 8, wherein the one or more logical data components comprises one or more of: user identification data, asset information associated with one or more users, a risk assessment associated with the one or more users, a credit score associated with the one or more users, or a tax assessment associated with the one or more users.

14. The method of claim 8, wherein the device data comprises one or more of: an IP address, a MAC address, a service identifier, timestamp data, or digital fingerprint data.

15. A system comprising:

a memory operable to store at least a first predetermined validation threshold and a second predetermined validation threshold;

a processor operably coupled to the memory, the processor configured to:

receive a request to perform an interaction that includes at least a first logical data component, a second logical data component, and device data from an external entity server;

compare the first logical data component to the first predetermined validation threshold;

compare the second logical data component to the second predetermined validation threshold;

determine whether the first logical data component and the second logical data component are validated, wherein the first logical data component and the second logical data component are validated if the first logical data component and the second logical data component satisfy the first predetermined validation threshold and the second predetermined validation threshold, respectively; and in response to determining that the first logical data component and the second logical data component satisfy the first predetermined validation threshold and the second predetermined validation threshold, respectively, the processor is configured to:

obfuscate the first logical data component by generating a first unique identifier associated with the first logical data component;

obfuscate the second logical data component by generating a second unique identifier associated with the second logical data component;

obfuscate the device data by generating a unique device identifier associated with the device data; and generate an authentication response configured to authorize the external entity server to perform the interaction, wherein the authentication response comprises the first unique identifier, the second unique identifier, and the unique device identifier.

16. The system of claim 15, wherein the processor is further configured to:

communicate the authentication response to the external entity server; and in response to receiving the authentication response, a processor of the external entity server is configured to perform the interaction.

17. The system of claim 15, wherein if the first logical data component and the second logical data component do not satisfy the first predetermined validation threshold and the second predetermined validation threshold, respectively, the processor is configured to deny the interaction; and in response to determining that the first logical data component and the second logical data component are not validated, the processor is configured to:
generate the authentication response, wherein the authentication response is configured to deny the external entity server from performing the interaction.

18. The system of claim 15, wherein the memory is further operable to store a third predetermined validation threshold, and wherein the processor is configured to:
receive a third logical data component;
compare the third logical data component to the third predetermined validation threshold;
determine whether the third logical data component is validated, wherein if the third logical data component satisfies the third predetermined validation threshold, the processor is further configured to authorize the interaction; and in response to determining that the third logical data component is validated, the processor is further configured to:
obfuscate the third logical data component by generating a third unique identifier associated with the third logical data component; and
generate the authentication response, wherein the authentication response is configured to authorize the external entity server to perform the interaction, wherein the authentication response further comprises the third unique identifier.

19. The system of claim 15, wherein the first logical data component comprises one or more of: user identification data, asset information associated with one or more users, a risk assessment associated with the one or more users, a credit score associated with the one or more users, or a tax assessment associated with the one or more users.

20. The system of claim 15, wherein the device data comprises one or more of: an IP address, a MAC address, a service identifier, timestamp data, or digital fingerprint data.

* * * * *

UNITED STATES PATENT AND TRADEMARK OFFICE
CERTIFICATE OF CORRECTION

PATENT NO. : 12,513,144 B2
APPLICATION NO. : 18/663588
DATED : December 30, 2025
INVENTOR(S) : George A. Albero et al.

Page 1 of 1

It is certified that error appears in the above-identified patent and that said Letters Patent is hereby corrected as shown below:

On the Title Page

Under Inventors Item (72) Line 5-6, please delete, "Durga Prasad Kuttumolu" and please insert -- Durga Prasad Kutthumolu --, therefor.

Signed and Sealed this
Tenth Day of February, 2026

John A. Squires
*Director of the United States Patent and Trademark Office*